United States Patent
Arakawa et al.

[11] Patent Number: 5,877,508
[45] Date of Patent: *Mar. 2, 1999

[54] RADIATION IMAGE STORAGE PANEL

[75] Inventors: Satoshi Arakawa; Osamu Kuroda, both of Kanagawa-ken, Japan

[73] Assignee: Fuji Photo Film Co., Ltd., Kanagawa-ken, Japan

[*] Notice: This patent issued on a continued prosecution application filed under 37 CFR 1.53(d), and is subject to the twenty year patent term provisions of 35 U.S.C. 154(a)(2).

The term of this patent shall not extend beyond the expiration date of Pat. No. 5,534,710.

[21] Appl. No.: 643,977

[22] Filed: May 7, 1996

Related U.S. Application Data

[63] Continuation of Ser. No. 554,102, Nov. 6, 1995, abandoned, which is a continuation of Ser. No. 308,700, Sep. 19, 1994, abandoned.

[30] Foreign Application Priority Data

Sep. 20, 1993 [JP] Japan .................................. 5-233271

[51] Int. Cl.⁶ .............................. G03B 42/02; A61B 6/00; G21K 4/00
[52] U.S. Cl. ........................ 250/588; 250/584; 250/484.4
[58] Field of Search ................................ 250/484.4, 588, 250/487.1, 584, 585, 586

[56] References Cited

U.S. PATENT DOCUMENTS

| | | | |
|---|---|---|---|
| 4,346,295 | 8/1982 | Tanaka et al. . | |
| 4,507,562 | 3/1985 | Gasiot et al. | 250/484.4 |
| 4,617,468 | 10/1986 | Shiraishi et al. | 250/484.4 |
| 4,675,271 | 6/1987 | Degenhardt | 250/484.4 |
| 4,883,961 | 11/1989 | Arakawa et al. . | |
| 4,950,559 | 8/1990 | Arakawa et al. | 250/484.4 |
| 4,999,505 | 3/1991 | Gasper et al. | 250/484.4 |
| 5,483,081 | 1/1996 | Hosoi | 250/487.1 |
| 5,534,710 | 7/1996 | Suzuki | 250/588 |

FOREIGN PATENT DOCUMENTS

| | | |
|---|---|---|
| 61-86743 | 5/1986 | Japan . |
| 4280060 | 10/1992 | Japan . |

*Primary Examiner*—Edward J. Glick
*Attorney, Agent, or Firm*—Sughrue, Mion, Zinn, Macpeak & Seas, PLLC

[57] ABSTRACT

A radiation image storage panel comprises a substrate and a stimulable phosphor layer, which is overlaid on the substrate and emits light in proportion to the amount of energy stored thereon during its exposure to radiation when it is exposed to stimulating rays. The substrate is constituted of a material, which transmits the light emitted by the stimulable phosphor layer and absorbs and/or scatters light having wavelengths falling within a stimulation wavelength range for the stimulable phosphor layer. The light having wavelengths falling within the stimulation wavelength range is thus prevented from passing or propagating through the substrate, and the signal-to-noise ratio of an image signal detected from the radiation image storage panel is thereby prevented from becoming low.

6 Claims, 3 Drawing Sheets

5,877,508

RADIATION IMAGE STORAGE PANEL

This is a Continuation of application Ser. No. 08/554,102 filed on Nov. 6, 1995, now abandoned, which is a Continuation application of Ser. No. 08/308,700 filed on Sep. 19, 1994, now abandoned.

BACKGROUND OF THE INVENTION

1. Field of the Invention

This invention relates to a radiation image storage panel and a radiation image read-out method, wherein the radiation image storage panel is utilized. This invention particularly relates to a radiation image storage panel suitable for an image read-out operation, wherein a radiation image stored on the radiation image storage panel is read out at least from the side of a substrate of the radiation image storage panel, and a radiation image read-out method utilizing the radiation image storage panel.

2. Description of the Prior Art

Radiation image read-out methods utilizing radiation image storage panels have heretofore been used widely. With the radiation image read-out methods, a radiation image storage panel (i.e., a stimulable phosphor sheet), which comprises a substrate and a layer of a stimulable phosphor overlaid on the substrate and on which a radiation image of an object, such as a human body, has been stored, is exposed to stimulating rays, such as a laser beam, which cause the radiation image storage panel to emit light in proportion to the amount of energy stored thereon during its exposure to radiation. The light, which is emitted by the radiation image storage panel when it is exposed to the stimulating rays, is photoelectrically detected and converted into an electric image signal. After the image signal has been detected from the radiation image storage panel, the radiation image storage panel is exposed to erasing light, which releases residual energy from the radiation image storage panel.

The image signal obtained from the radiation image read-out methods is subjected to image processing, such as gradation processing and frequency processing, such that a visible radiation image having good image quality can be reproduced and used as an effective tool in, particularly, the accurate and efficient diagnosis of an illness. The image signal, which is obtained from the image processing, is used for the reproduction of the visible image on a photographic film or on a cathode ray tube. Energy remaining on the radiation image storage panel is erased in the manner described above such that the radiation image storage panel can be reused to record a radiation image.

Novel radiation image read-out methods have been disclosed in, for example, Japanese Unexamined Patent Publication No. 61(1986)-86743 and U.S. Pat. No. 4,883,961. In the disclosed radiation image read-out methods, while an image signal is being detected from a radiation image storage panel on which a radiation image has been stored, the regions of the radiation image storage panel, from which the image signal has been detected, are erased one after another. The disclosed radiation image read-out methods have the advantage in that the operation for reading out a radiation image from a radiation image storage panel and the operation for erasing energy remaining on the radiation image storage panel can be carried out approximately simultaneously, and therefore the cycle time of the whole system can be kept short.

Also, techniques for detecting light emitted by two surfaces of a radiation image storage panel have been proposed in, for example, U.S. Pat. No. 4,346,295 and Japanese Unexamined Patent Publication No. 4(1992)-280060. With the proposed techniques, the substrate of the radiation image storage panel is constituted of a transparent material capable of transmitting light, which is emitted by the stimulable phosphor layer of the radiation image storage panel, and the light emitted by the stimulable phosphor layer is detected approximately simultaneously from the two surfaces of the radiation image storage panel. In this manner, the efficiency, with which the light emitted by the radiation image storage panel is collected, is kept high. Further, the image signal components of two image signals having been detected from the opposite surfaces of the radiation image storage panel are added together in a predetermined addition ratio, which image signal components represent corresponding picture elements on the front and back surfaces of the radiation image storage panel. In this manner, the signal-to-noise ratio is kept high.

In cases where the radiation image storage panel provided with the substrate, which is constituted of a transparent material, is utilized, it is also considered to read out the image information only from the back side (i.e. the side of the substrate) of the radiation image storage panel.

However, if the substrate of the radiation image storage panel is constituted of a transparent material such that the light emitted by the stimulable phosphor layer can pass through the substrate, the substrate will also transmit the stimulating rays. Also, the stimulating rays can propagate through the substrate. In cases where, the image information is read out with an image read-out system, such as a photoelectric read-out means, from the back side of the radiation image storage panel provided with the substrate, the stimulating rays, which have passed through the substrate, impinge as noise upon the image read-out system. Therefore, the signal-to-noise ratio cannot be kept high. Further, the stimulating rays propagate through the substrate and stimulate the stimulable phosphor located at regions other than the region of the stimulable phosphor layer, which is to be stimulated. As a result, light is unexpectedly emitted by the regions other than the region of the stimulable phosphor layer, which is to be stimulated. The light emitted unexpectedly will often impinge upon the image read-out system. In such cases, an image having good image quality cannot be reproduced from the image signal, which has thus been detected. Ordinarily, the image read-out system is provided with a stimulating ray cutting filter, which prevents the stimulating rays from entering the image read-out system. Therefore, it is possible to prevent the aforesaid stimulating rays from entering the image read-out system. However, with the stimulating ray cutting filter, it is not possible to cut the light, which is emitted by unexpected regions of the stimulable phosphor layer.

The substrate described above also transmits the erasing light. Also, the erasing light can propagate through the substrate. Therefore, with the technique wherein the image read-out operation and the erasing operation are carried out approximately simultaneously, the erasing light propagates through the substrate. Therefore, as in the case of the stimulating rays described above, the erasing light impinges as noise upon the image read-out system. Accordingly, the signal-to-noise ratio of the detected image signal cannot be kept high. Further, the erasing light stimulates the stimulable phosphor located at regions other than the region of the stimulable phosphor layer, which is to be stimulated. As a result, light is unexpectedly emitted by the regions other than the region of the stimulable phosphor layer, which is to be stimulated. Moreover, the erasing light erases the image information stored in the regions, from which the image information has not yet been read out.

SUMMARY OF THE INVENTION

The primary object of the present invention is to provide a radiation image storage panel, wherein light having wavelengths falling within the stimulation wavelength range for a stimulable phosphor layer, such as stimulating rays and erasing light, is prevented from passing or propagating through a substrate of the radiation image storage panel, and the signal-to-noise ratio of an image signal detected from the radiation image storage panel is thereby prevented from becoming low.

Another object of the present invention is to provide a radiation image storage panel, wherein unexpected regions of a stimulable phosphor layer of the radiation image storage panel are prevented from being stimulated, and image information stored on regions, from which the image information has not yet been read out, is prevented from being lost.

The specific object of the present invention is to provide a radiation image read-out method, wherein the radiation image storage panel is utilized.

The present invention provides a radiation image storage panel comprising a substrate and a stimulable phosphor layer, which is overlaid on the substrate and emits light in proportion to the amount of energy stored thereon during its exposure to radiation when it is exposed to stimulating rays, wherein the substrate is constituted of a material, which transmits the light emitted by the stimulable phosphor layer and absorbs and/or scatters light having wavelengths falling within a stimulation wavelength range for the stimulable phosphor layer.

The term "light having wavelengths falling within a stimulation wavelength range for a stimulable phosphor layer" as used herein means the stimulating rays (wavelengths: 630 nm to 690 nm), which are used when the radiation image is to be read out from the radiation image storage panel, and the erasing light (wavelengths: 550 nm to 700 nm), which is used when the image information remaining on the radiation image storage panel is to be erased. The wavelengths of the light having wavelengths falling within the stimulation wavelength range for the stimulable phosphor layer ordinarily range from 500 nm to 1,100 nm, depending on the kind of the stimulable phosphor layer, and should preferably range from 500 nm to 800 nm.

Ordinarily, the light emitted by the stimulable phosphor layer has wavelengths falling within the range of 380 nm to 420 nm. The range of the wavelengths of the light emitted by the stimulable phosphor layer is different from and far apart from the stimulation wavelength range for the stimulable phosphor layer. Therefore, as the substrate constituted of the material, which transmits the light emitted by the stimulable phosphor layer (preferably, with a normal transmittance of 80% or more) and absorbs and/or scatters the light having wavelengths falling within the stimulation wavelength range for the stimulable phosphor layer, one of the following substrates can be used:

i) a substrate constituted of a color glass filter, ii) a substrate containing a pigment or a dye, and iii) a substrate containing a small proportion of a white pigment dispersed therein.

More specifically, one of the following substrates can be utilized:

i) a substrate constituted of a color glass filter B410 supplied by Hoya Corp., and ii) a substrate containing a pigment or a dye, such as ultramarine blue or copper phthalocyanine.

In cases where the radiation image storage panel has a protective layer for protecting the surface of the stimulable phosphor layer, the protective layer should preferably contain a pigment or a dye as in the substrate. In such cases, the normal transmittance of the protective layer with respect to the stimulating rays should preferably be 80% or more, and the normal transmittance of the protective layer with respect to the light emitted by the stimulable phosphor layer should preferably be 80% or more.

The present invention also provides a first radiation image read-out method for scanning a radiation image storage panel, which comprises a substrate and a stimulable phosphor layer overlaid on the substrate and on which a radiation image has been stored, with stimulating rays, which cause the stimulable phosphor layer of the radiation image storage panel to emit light in proportion to the amount of energy stored thereon during its exposure to radiation, and detecting the emitted light with a photoelectric read-out means, which is located at least on the side of the substrate of the radiation image storage panel, an image signal being thereby obtained, wherein the improvement comprises utilizing, as the radiation image storage panel, a radiation image storage panel comprising a substrate constituted of a material, which transmits light emitted by a stimulable phosphor layer and absorbs and/or scatters at least the stimulating rays among light having wavelengths falling within a stimulation wavelength range for the stimulable phosphor layer, and the stimulable phosphor layer, which is overlaid on the substrate.

The operation for reading out the radiation image may be carried out on the sides of the two surfaces of the radiation image storage panel.

The present invention further provides a second radiation image read-out method comprising:

i) an image read-out process for scanning a radiation image storage panel, which comprises a substrate and a stimulable phosphor layer overlaid on the substrate and on which a radiation image has been stored, with stimulating rays, which cause the stimulable phosphor layer of the radiation image storage panel to emit light in proportion to the amount of energy stored thereon during its exposure to radiation, and detecting the emitted light with a photoelectric read-out means, which is located at least on the side of the substrate of the radiation image storage panel, an image signal being thereby obtained, and ii) an erasing process for irradiating erasing light, which releases energy remaining on the radiation image storage panel, to regions of the radiation image storage panel, from which the image information has been read out in the image read-out process, the image read-out process and the erasing process being carried out simultaneously with each other, wherein the improvement comprises utilizing, as the radiation image storage panel, a radiation image storage panel comprising a substrate constituted of a material, which transmits light emitted by a stimulable phosphor layer and absorbs and/or scatters at least the erasing light among light having wavelengths falling within a stimulation wavelength range for the stimulable phosphor layer, and the stimulable phosphor layer, which is overlaid on the substrate.

The operation for reading out the radiation image and/or the erasing operation may be carried out on the sides of the two surfaces of the radiation image storage panel. Also, the substrate may be constituted of a material which also absorbs and/or scatters the stimulating rays.

With the radiation image storage panel in accordance with the present invention, the light having wavelengths falling within the stimulation wavelength range for the stimulable phosphor layer, such as the stimulating rays, which are irradiated to the radiation image storage panel when the radiation image is to be read out from the radiation image storage panel, and the erasing light, which is irradiated to the radiation image storage panel when energy remaining on the radiation image storage panel is to be erased, is absorbed and/or scattered by the substrate of the radiation image storage panel. Therefore, the light having wavelengths falling within the stimulation wavelength range for the stimulable phosphor layer does not pass or hardly passes through the substrate and does not impinge or hardly impinges upon the image read-out system located on the side of the substrate. In this manner, the signal-to-noise ratio of the image signal can be prevented from becoming low. Also, as for the image read-out system, a stimulating ray cutting filter, which prevents the light having wavelengths falling within the stimulation wavelength range for the stimulable phosphor layer from entering the image read-out system, can be omitted or simplified.

Further, the light having wavelengths falling within the stimulation wavelength range for the stimulable phosphor layer hardly propagates through the substrate. Therefore, the problems can be prevented from occurring or reduced in that the light having wavelengths falling within the stimulation wavelength range for the stimulable phosphor layer impinges upon an unexpected regions of the stimulable phosphor layer to cause the unexpected regions to emit light, or in that the light erases the image information stored on the regions, from which the image information has not yet been read out.

On the other hand, the light emitted by the stimulable phosphor layer of the radiation image storage panel can pass through the substrate. Therefore, the emitted light can be detected also from the side of the substrate.

With the first radiation image read-out method in accordance with the present invention, regions of the stimulable phosphor layer of the radiation image storage panel, on which the radiation image has been stored, are scanned with the stimulating rays, and the scanned regions emit light in proportion to the amount of energy stored thereon during their exposure to the radiation. The emitted light passes through the substrate and is sequentially detected by the photoelectric read-out means, which is located on the side of the substrate of the radiation image storage panel. In this manner, an image signal is obtained. The image signal is fed into an external signal processing unit and is subjected to predetermined image processing. On the other hand, even if the stimulating rays impinge upon the substrate, they are absorbed and/or scattered by the substrate. Therefore, the level of energy of the stimulating rays becomes low, and the stimulating rays do not stimulate or hardly stimulate unexpected regions of the stimulable phosphor layer. Also, the stimulating rays hardly impinge upon the photoelectric read-out means, which is located on the side of the substrate. Therefore, the signal-to-noise ratio of the image signal can be prevented from becoming low. Further, as for the image read-out system, a stimulating ray cutting filter, which prevents the light having wavelengths falling within the stimulation wavelength range for the stimulable phosphor layer from entering the image read-out system, can be omitted or simplified.

With the second radiation image read-out method in accordance with the present invention, wherein the image read-out process and the erasing process are carried out simultaneously, the erasing light is absorbed and/or scattered by the substrate of the radiation image storage panel. Therefore, the erasing light hardly propagates through the substrate. Accordingly, the erasing light does not impinge upon the image read-out system in the image read-out process, and the signal-to-noise ratio of the image signal can be prevented from becoming low. Also, the image information stored in the regions of the radiation image storage panel, from which the image information has not yet been read out, is not or hardly lost.

Moreover, in cases where the technique for detecting the light emitted by two surfaces of the radiation image storage panel is employed, and the image read-out operation and the erasing operation are carried out approximately simultaneously with each other, the signal-to-noise ratio of the image signal can be prevented from becoming low similarly to the aforesaid cases, and the image information is not or hardly lost unexpectedly. Also, the total time required to carry out the image read-out operation and the erasing operation can be kept short, and the cycle time can thereby be kept short. Also, the space in the radiation image read-out apparatus can be utilized efficiently.

DESCRIPTION OF THE PREFERRED EMBODIMENTS

The present invention will hereinbelow be described in further detail with reference to the accompanying drawings.

Figure 1:
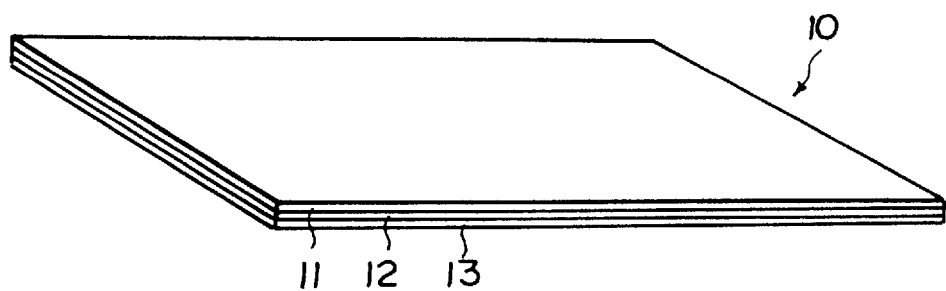
FIG. 1 is a perspective view showing an embodiment of the radiation image storage panel in accordance with the present invention.
Figure 2:
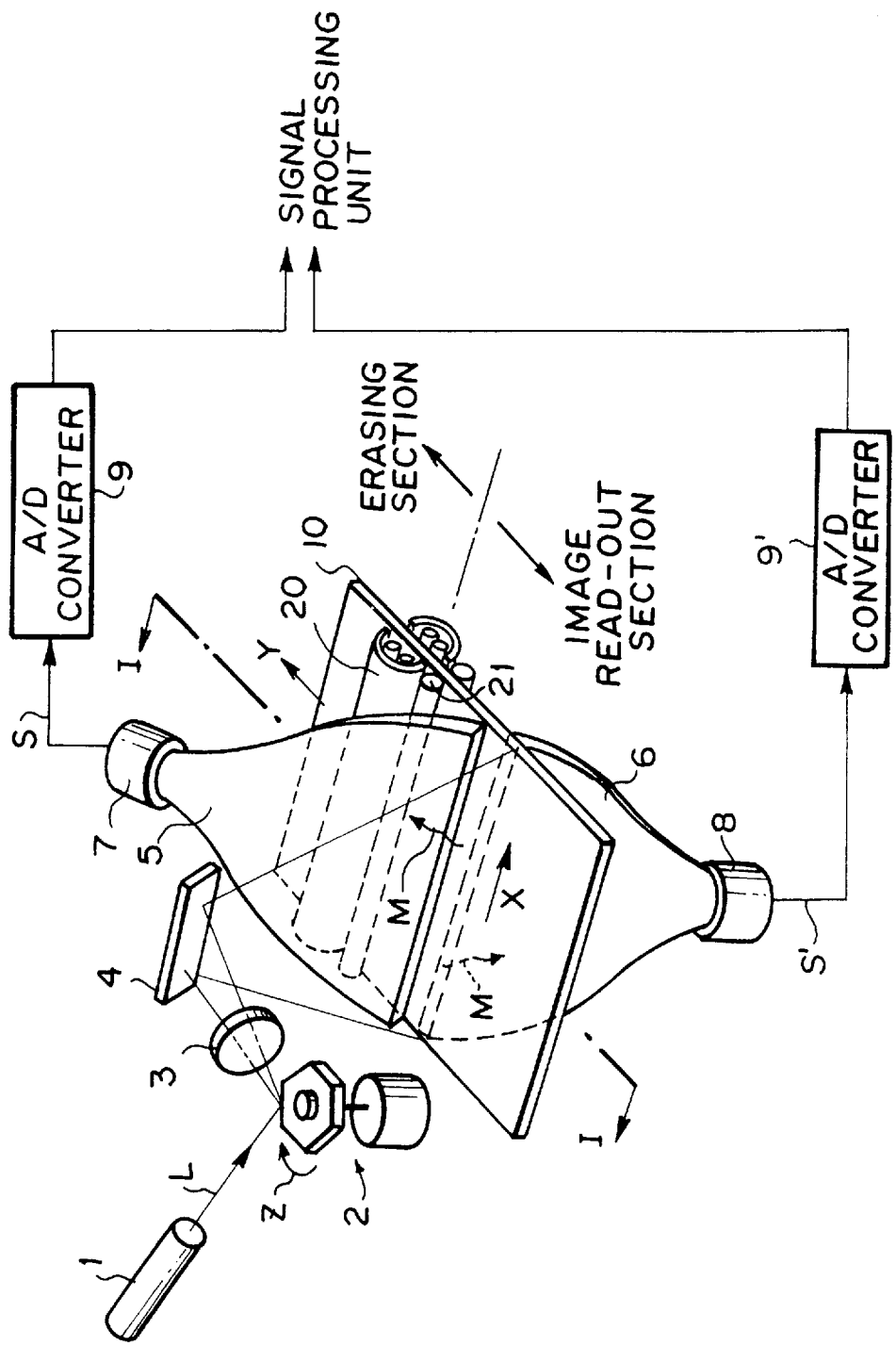
FIG. 2 is a schematic view showing a radiation image read-out apparatus for carrying out the radiation image read-out method in accordance with the present invention, wherein the radiation image storage panel shown in FIG. 1 is utilized.
Figure 3:
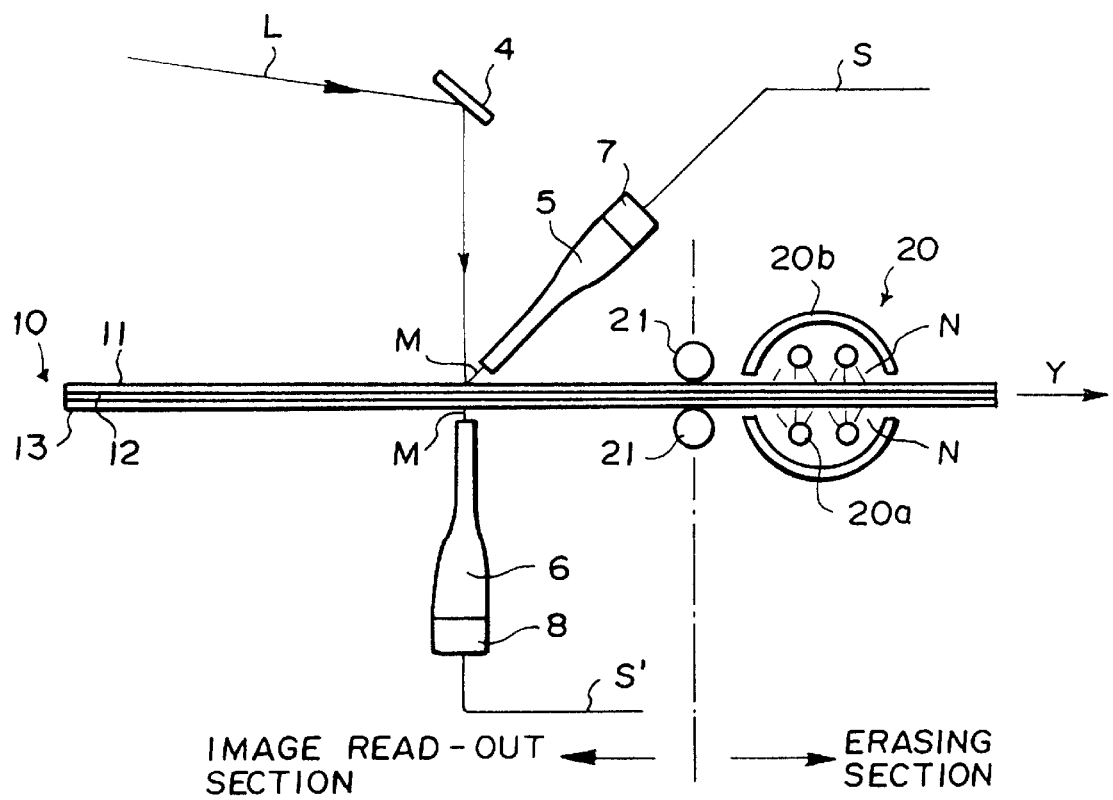
FIG. 3 is a sectional view taken along line I—I of FIG. 2.

FIG. 1 is a perspective view showing an embodiment of the radiation image storage panel in accordance with the present invention. FIG. 2 schematically shows a radiation image read-out apparatus for carrying out the radiation image read-out method in accordance with the present invention, wherein the radiation image storage panel shown in FIG. 1 is utilized. FIG. 3 is a sectional view taken along line I—I of FIG. 2. With reference to FIG. 1, a radiation image storage panel 10 comprises a base (i.e. a substrate) 13, which is constituted of a color glass filter, and a stimulable phosphor layer 12, which is overlaid on the base 13 and composed of a binder and a stimulable phosphor dispersed in the binder. The radiation image storage panel 10 also comprises a protective layer 11, which is overlaid on the surface of the stimulable phosphor layer 12 opposite to the base 13 and which protects the stimulable phosphor layer 12.

The base 13 may be constituted of a color glass filter, such as B410 supplied by Hoya Corp. The base 13 absorbs almost all of the light having wavelengths falling within the stimulation wavelength range (500 nm to 800 nm) for the stimulable phosphor layer 12.

How the radiation image storage panel 10 works will be described hereinbelow with reference to FIGS. 2 and 3. The illustrated radiation image read-out apparatus comprises an image read-out section, in which a radiation image stored on the radiation image storage panel 10 is read out, and an erasing section provided with an erasing light source 20 for producing erasing light N (wavelength: 550 nm to 700 nm). The erasing light N is irradiated to the regions of the radiation image storage panel 10, from which the image information has been read out. In this manner, the erasing light N releases energy remaining on the regions of the radiation image storage panel 10, from which the image information has been read out. The radiation image read-out apparatus also comprises light shielding rollers 21, 21. The light shielding rollers 21, 21 are located between the erasing section and the image read-out section and prevent the erasing light N, which is irradiated in the erasing section, from going to the regions of the radiation image storage panel 10, from which the image information has not yet been read out and which are located in the image read-out section.

The image read-out section comprises a laser beam source 1, which produces a laser beam L (wavelength: 630 nm to 690 nm). The image read-out section also comprises a rotating polygon mirror 2, an fθ lens 3, and a mirror 4, which cause the laser beam L having been produced by the laser beam source 1 to scan the stimulable phosphor layer 12 of the radiation image storage panel 10 via the protective layer 11 (i.e. via the front surface) of the radiation image storage panel 10. When the stimulable phosphor layer 12 of the radiation image storage panel 10 is scanned with the laser beam L in the direction indicated by the arrow X, the scanned portion of the stimulable phosphor layer 12 emits light M in proportion to the amount of energy stored thereon during its exposure to radiation. The image read-out section further comprises a light guide member 5, which is located at a position for guiding the emitted light M on the side of the protective layer 11 of the radiation image storage panel 10, and a light guide member 6, which is located at a position for guiding the emitted light M on the side of the base 13 (i.e. on the side of the back surface) of the radiation image storage panel 10. The image read-out section still further comprises photomultipliers 7 and 8 for photoelectrically converting the emitted light M, which has been guided by the light guide members 5 and 6, and thereby obtaining image signals S and S'. The image read-out section also comprises analog-to-digital converters 9 and 9' for converting the obtained image signals S and S' into digital image signals.

The protective layer 11 has the characteristics such that the normal transmittance with respect to the laser beam L is 80% or more. Also, the protective layer 11 and the base 13 have the characteristics such that their normal transmittances with respect to the emitted light M are 80% or more, and such that they approximately perfectly absorb the erasing light N.

The erasing light source 20 comprises erasing lamps 20a and a cover 20b. The cover 20b prevents the erasing light N from diffusing to the space other than the predetermined irradiation range on the radiation image storage panel 10.

The laser beam L, which has been produced by the laser beam source 1, impinges upon the rotating polygon mirror 2, which is rotating in the direction indicated by the arrow Z. The laser beam L is then condensed by the fθ lens 3 and reflected by the mirror 5. In this manner, the laser beam L scans the surface of the radiation image storage panel 10, on which the radiation image has been stored, in the main scanning direction indicated by the arrow X. At the same time, the radiation image storage panel 10 is conveyed by a sub-scanning means (not shown) in the sub-scanning direction indicated by the arrow Y.

When the stimulable phosphor layer 12 of the radiation image storage panel 10 is exposed to the laser beam L, the exposed portion of the stimulable phosphor layer 12 emits the light M in proportion to the amount of energy stored thereon during its exposure to radiation. The emitted light M passes through the protective layer 11 and is guided by the light guide member 5, which is located on the side of the front surface of the radiation image storage panel 10. The emitted light M is then photoelectrically converted by the photomultiplier 7, and the image signal S is thereby obtained.

Also, the emitted light M passes through the base 13 and is guided by the light guide member 6, which is located on the side of the back surface of the radiation image storage panel 10. The emitted light M is then photoelectrically converted by the photomultiplier 8, and the image signal S' is thereby obtained.

In the manner described above, the image signals S and S' are detected from the two surfaces of the radiation image storage panel 10 in the image read-out section. The image signals S and S' are respectively converted logarithmically and then converted into digital image signals by the analog-to-digital converters 9 and 9'. The digital image signals are then fed into a signal processing unit, which carries out various appropriate types of image processing, such as superposition processing, on the digital image signals. The image signal obtained from the signal processing unit is used for the reproduction of a visible radiation image, which has good image quality and can serve as an effective tool in, particularly, the efficient and accurate diagnosis of an illness, on a cathode ray tube display device or photographic film.

The laser beam L passes through the stimulable phosphor layer 12 and reaches the base 13. However, the laser beam L is absorbed by the base 13 and does not impinge upon the light guide member 6, which is located on the back surface side of the radiation image storage panel 10. Therefore, the light guide member 6, which is located on the back surface side of the radiation image storage panel 10, need not necessarily be provided with a stimulating ray cutting filter. Also, the problems do not occur in that the laser beam L propagates through the base 13 and stimulates unexpected regions of the stimulable phosphor layer 12.

While the image read-out operation is being carried out, the radiation image storage panel 10 is conveyed by the sub-scanning means (not shown) in the sub-scanning direction indicated by the arrow Y. In this manner, the regions of the radiation image storage panel 10, from which the image information has been read out in the image read-out section, are sequentially conveyed via the light shielding rollers 21, 21 into the adjacent erasing section.

When the regions of the radiation image storage panel 10, from which the image information has been read out, have been sequentially conveyed into the adjacent erasing section, the erasing light N, which has been produced by the erasing light source 20, is irradiated to the two surfaces of radiation image storage panel 10. In this manner, energy remaining on the radiation image storage panel 10 after the image information has been read out therefrom is released.

At this time, the erasing light N is absorbed by the base 13 of the radiation image storage panel 10. Therefore, the problems do not occur in that the erasing light N propagates through the base 13 and impinges upon the light guide member 6, which is located on the back surface side of the radiation image storage panel 10. Further, the image information stored in the regions of the radiation image storage panel 10, from which the image information has not yet been read out, can be prevented from being lost due to the erasing light N.

As described above, with the embodiment of the radiation image storage panel in accordance with the present invention, in cases where the radiation image is read out at least from the side of the substrate of the radiation image storage panel and in cases where the image read-out operation and the erasing operation are carried out approximately simultaneously with each other, the stimulating rays and the erasing light can be prevented from impinging upon the image read-out system. Also, the image information can be prevented from being lost unexpectedly, and the stimulable phosphor layer of the radiation image storage panel can be prevented from being stimulated unexpectedly.

Also, in cases where the technique for detecting light emitted by two surfaces of the radiation image storage panel and the technique for simultaneously carrying out the image read-out operation and the erasing operation are combined with each other as in the embodiment described above, the signal-to-noise ratio of the image signal can be kept high, and the cycle time can be kept short as a whole. Further, the image read-out section and the erasing section can be located close to each other, and therefore the size of the radiation image read-out apparatus can be kept small.

The aforesaid embodiment of the radiation image storage panel in accordance with the present invention is provided with the protective layer 11, which is overlaid on the surface of the stimulable phosphor layer 12 in order to protect it from scratching, and the like. However, it is necessary for the protective layer 11 to be capable of transmitting the stimulating rays, and it is considered that the stimulating rays will propagate through the protective layer 11. Therefore, the radiation image storage panel should preferably have a structure having no protective layer 11.

The radiation image read-out method in accordance with the present invention is not limited to the aforesaid embodiment wherein the image read-out operation and the erasing operation are carried out simultaneously. The radiation image read-out method in accordance with the present invention is applicable widely when a radiation image is read out at least from the side of the substrate of the radiation image storage panel. Specifically, the radiation image read-out method in accordance with the present invention is applicable when the radiation image is read out only from the side of the substrate of the radiation image storage panel or from the two surfaces of the radiation image storage panel.

In cases where the technique for simultaneously carrying out the image read-out operation and the erasing operation is employed, the erasing light need not necessarily be irradiated from the two surfaces of the radiation image storage panel. In cases where the radiation image is read out at least from the side of the substrate, the erasing light may be irradiated only from the side of the substrate or only from the side of the stimulable phosphor layer. This is because the erasing light will pass through the stimulable phosphor layer, and part of the erasing light will impinge upon the substrate.

What is claimed is:

1. A radiation image read-out method comprising:
   i) performing an image read-out process for scanning a radiation image storage panel which comprises a substrate and a stimulable phosphor layer overlaid on the substrate and on which a radiation image has been stored, by stimulating the storage panel with stimulating rays which cause the stimulable phosphor layer of the radiation image storage panel to emit light in proportion to the amount of energy stored thereon during its exposure to radiation, and detecting the emitted light with a photoelectric read-out unit which is located at least on the side of the substrate of the radiation image storage panel, an image signal being thereby obtained;
   ii) performing an erasing process for irradiating erasing light to regions of the radiation image storage panel from which the image information has been read out in the image read-out process, which releases energy remaining on the radiation image storage panel, wherein the image read-out process and the erasing process are carried out simultaneously with each other, wherein the radiation image storage panel comprises:
   a substrate; and
   a stimulable phosphor layer, which is overlaid on the substrate and emits light in proportion to the amount of energy stored thereon during its exposure to radiation when it is exposed to the stimulating rays, wherein the substrate is comprised of a material which transmits the light emitted by the stimulable phosphor layer and absorbs and/or scatters erasing light.

2. A radiation image read-out method as defined in claim 1, wherein the stimulating rays are a laser beam.

3. A radiation image read-out method as defined in claim 1, wherein performing an image read-out process comprises two-dimensionally scanning the radiation image storage panel with the stimulating rays.

4. A radiation image read-out method comprising:
   performing an image read-out process for scanning a radiation image storage panel which includes a substrate and a stimulable phosphor layer overlaid on the substrate and on which a radiation image has been stored by stimulating said storage panel with stimulating rays which cause the stimulable phosphor layer of the radiation image storage panel to emit light in proportion to the amount of energy stored thereon during its exposure to radiation, and detecting the emitted light with a photoelectric read-out unit which is located on opposite sides of the radiation image storage panel, two image signals being thereby obtained;
   performing an erasing process for irradiating erasing light to regions of the radiation image storage panel from which the image information has been read out in the image read-out process, thereby releasing energy remaining on the radiation image storage panel, wherein the image read-out process and the erasing process are carried out simultaneously with each other, and wherein the radiation image storage panel comprises:
   a substrate; and
   a stimulable phosphor layer, which is overlaid on the substrate and emits light in proportion to the amount of energy stored thereon during its exposure to radiation when it is exposed to the stimulating rays, wherein the substrate is comprised of a material which transmits the light emitted by the stimulable phosphor layer and absorbs and/or scatters erasing light.

5. A radiation image read-out method as defined in claim 4, wherein the stimulating rays are a laser beam.

6. A radiation image read-out method as defined in claim 4, wherein performing an image read-out process comprises:
   two-dimensionally scanning the radiation image storage panel with the stimulating rays.

* * * * *